(12) United States Patent
Xu et al.

(10) Patent No.: US 11,789,328 B2
(45) Date of Patent: Oct. 17, 2023

(54) LIQUID CRYSTAL DISPLAY PANEL AND ALIGNMENT METHOD THEREOF

(71) Applicant: TCL CHINA STAR OPTOELECTRONICS TECHNOLOGY CO., LTD., Guangdong (CN)

(72) Inventors: Yue Xu, Guangdong (CN); Yani Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 185 days.

(21) Appl. No.: 17/419,805

(22) PCT Filed: May 31, 2021

(86) PCT No.: PCT/CN2021/097342
§ 371 (c)(1),
(2) Date: Jun. 30, 2021

(87) PCT Pub. No.: WO2022/198789
PCT Pub. Date: Sep. 29, 2022

(65) Prior Publication Data
US 2022/0357606 A1   Nov. 10, 2022

(30) Foreign Application Priority Data

Mar. 26, 2021   (CN) .......................... 202110323536.7

(51) Int. Cl.
*G02F 1/137*   (2006.01)
*G02F 1/133*   (2006.01)
(Continued)

(52) U.S. Cl.
CPC .......... *G02F 1/137* (2013.01); *G02F 1/13306* (2013.01); *G02F 1/134309* (2013.01);
(Continued)

(58) Field of Classification Search
CPC ................ G02F 1/137; G02F 1/13306; G02F 1/134309; G02F 1/136286
See application file for complete search history.

(56) References Cited

U.S. PATENT DOCUMENTS

2008/0284719 A1* 11/2008 Yoshida .............. G02F 1/13392
349/37
2009/0135117 A1    5/2009 Cho
(Continued)

FOREIGN PATENT DOCUMENTS

CN           101567170 A      10/2009
CN           102736325 A      10/2012
(Continued)

*Primary Examiner* — Lucy P Chien
(74) *Attorney, Agent, or Firm* — Mark M. Friedman

(57) ABSTRACT

The present invention provides a liquid crystal display panel and an alignment method of the liquid crystal display panel. By inputting a voltage equal to a pixel voltage into data black-matrix less (DBS) electrodes at a gray scale 255, rotation of liquid crystals at the DBS electrodes can be consistent with rotation of liquid crystals at the pixel electrodes during an alignment process. Therefore, the present invention improves brightness at the DBS electrodes of the liquid crystal display panel at the gray scale 255, and increases light transmittance of the liquid crystal display panel.

10 Claims, 2 Drawing Sheets

(51) Int. Cl.
  *G02F 1/1343* (2006.01)
  *G02F 1/1362* (2006.01)
  *G09G 3/20* (2006.01)
  *G09G 3/36* (2006.01)
  *G02F 1/1368* (2006.01)

(52) U.S. Cl.
  CPC ..... *G02F 1/136286* (2013.01); *G09G 3/2007* (2013.01); *G09G 3/3688* (2013.01); *G09G 3/3696* (2013.01); *G02F 1/1368* (2013.01); *G02F 2203/30* (2013.01); *G09G 2320/0233* (2013.01)

(56) References Cited

U.S. PATENT DOCUMENTS

| | | | | |
|---|---|---|---|---|
| 2017/0176828 A1* | 6/2017 | Tseng | ................ | G02F 1/136209 |
| 2018/0114495 A1* | 4/2018 | Jung | .................... | G09G 3/3607 |

FOREIGN PATENT DOCUMENTS

| | | | |
|---|---|---|---|
| CN | 202522819 | A | 11/2012 |
| CN | 103558717 | A | 2/2014 |
| CN | 104238222 | A | 12/2014 |
| CN | 107817631 | A | 3/2018 |
| CN | 107942587 | A | 4/2018 |
| CN | 108630165 | A | 10/2018 |
| CN | 110082970 | A | 8/2019 |
| CN | 110703515 | A | 1/2020 |
| CN | 110806653 | A | 2/2020 |
| CN | 111308801 | A | 6/2020 |
| CN | 1111258131 | A | 6/2020 |
| CN | 111580317 | A | 8/2020 |

\* cited by examiner

LIQUID CRYSTAL DISPLAY PANEL AND ALIGNMENT METHOD THEREOF

FIELD OF DISCLOSURE

The present invention relates to a field of display technology and in particular, to a liquid crystal display panel and an alignment method thereof.

DESCRIPTION OF RELATED ART

Liquid crystal displays (LCDs) have many advantages such as thinness, power saving, and no radiation, so LCDs are used extensively and have a dominant position in the field of flat panel displays. Currently, most of the LCDs on the market are backlit LCDs which comprise liquid crystal display panels and backlight modules. Working principles of the LCD panels are to inject liquid crystal molecules between a thin film transistor array substrate (TFT array substrate) and a color filter substrate (CF substrate), and apply a driving voltage on the two substrates to control a rotation direction of the liquid crystal molecules to refract light from a backlight module to produce images.

Conventional liquid crystal display panels need to set a black matrix (BM) on one side of the CF substrate to shield light. When the BM is used in a curved liquid crystal display panel, a position of the BM is offset from bending of the panel, thus causing light leakage and color shifts. In order to solve this problem, a conventional technique adopts a design of reducing the BM on a data line (data BM less, or DBS for short). No voltages are applied to DBS electrodes, and liquid crystals corresponding to the DBS electrodes do not rotate and present a black state, which replaces the BM for light shielding.

In conventional techniques, when an alignment process is performed on a liquid crystal display panel using a high vertical alignment (HVA alignment) technology and the DBS technology, no voltages are applied to the DBS electrodes, the liquid crystals corresponding to the DBS electrodes do not rotate, and voltages are applied between pixel electrodes and CF common electrodes. Therefore, rotation angles of the liquid crystals near a DBS electrode area among the liquid crystals corresponding to the pixel electrodes are affected by the liquid crystals corresponding to the DBS electrodes, which affects light transmittance of the liquid crystal display panel.

SUMMARY

A liquid crystal display panel and an alignment method thereof provided by the present invention can improve light transmittance of the liquid crystal display panel.

In order to solve the above-mentioned problem, the present invention provides technical solutions as follows.

In one aspect, the present invention provides an alignment method of a liquid crystal display panel, comprising:

step S1: providing a liquid crystal display panel, wherein the liquid crystal display panel comprises an array substrate, a color filter substrate, and liquid crystals formed between the array substrate and the color filter substrate; the array substrate comprises a plurality of data black-matrix less (DBS) electrodes and a plurality of pixel electrodes; and a plurality of first common electrodes are disposed on one side of the color filter substrate and arranged facing the liquid crystals;

step S2: inputting a DBS voltage, a pixel voltage, and a first common voltage to each of the DBS electrodes, each of the pixel electrodes, and each of the first common electrodes, wherein at a gray scale 255, the DBS voltage is equal to the pixel voltage; and step S3: aligning the liquid crystals of the liquid crystal display panel.

The alignment method of the liquid crystal display panel according to claim 1, wherein the DBS voltage is equal to the first common voltage at the gray scale ranging from 0 to 254.

In an optional embodiment of the present invention, the array substrate further comprises a plurality of data lines, and projections of the DBS electrodes cover the data lines.

In an optional embodiment of the present invention, the data lines are electrically connected to the pixel electrodes through a plurality of thin film transistors.

In an optional embodiment of the present invention, the liquid crystal display panel further comprises a voltage input control unit, and the voltage input control unit is configured to input the pixel voltage, the DBS voltage, and the first common voltage to each of the pixel electrodes, each of the DBS electrodes, and each of the first common electrodes.

In an optional embodiment of the present invention, the pixel voltage and the DBS voltage both comprise a positive frame voltage and a negative frame voltage.

In an optional embodiment of the present invention, the voltage input control unit comprises a timing controller, a gamma voltage generation module, and a source driver;

an input end of the gamma voltage generation module is electrically connected to a first control end of the timing controller, a second control end of the timing controller is electrically connected to a second input end of the source driver, a first input end of the source driver is electrically connected to an output end of the gamma voltage generation module, and an output end of the source driver is electrically connected to the pixel electrodes, the DBS electrodes, and the first common electrodes;

the gamma voltage generation module is configured to generate a gamma voltage;

the timing controller is configured to control the gamma voltage generation module to output the gamma voltage to the source driver; and the source driver is configured to divide the gamma voltage and output divided gamma voltages to obtain the pixel voltage or the DBS voltage or the first common voltage that matches a number of the pixel electrodes or a number of the DBS electrodes or a number of the first common electrodes.

In a second aspect, the present invention provides a liquid crystal display panel, comprising:

an array substrate comprising a plurality of data black-matrix less (DBS) electrodes and a plurality of pixel electrodes;

a color filter substrate, wherein a plurality of first common electrodes are disposed on one side of the color filter substrate; and liquid crystals formed between the array substrate and the color filter substrate;

wherein at a gray scale 255, voltages of the DBS electrodes are equal to voltages of the pixel electrodes.

In an optional embodiment of the present invention, the voltages of the DBS electrodes are equal to voltages of the first common electrodes at the gray scale ranging from 0 to 254.

In an optional embodiment of the present invention, the voltages of the pixel electrodes and the voltages of the DBS electrodes all comprise a positive frame voltage and a negative frame voltage.

Advantages of the Present Invention

In the liquid crystal display panel and the alignment method of the liquid crystal display panel of the present invention, a voltage equal to the pixel voltage is input into the DBS electrode at the gray scale 255, which can make rotation of the liquid crystals at the DBS electrodes consistent with rotation of the liquid crystals at the pixel electrodes during an alignment process. As a result, the present invention improves brightness at the DBS electrodes of the liquid crystal display panel at the gray scale 255, thereby increasing light transmittance of the liquid crystal display panel.

BRIEF DESCRIPTION OF DRAWINGS

In order to more clearly illustrate technical solutions in the embodiments of the present invention, figures which will be described in the embodiments are briefly introduced hereinafter. It is obvious that the drawings are only for illustrating some embodiments of the present disclosure, and a person having ordinary skill in this field can obtain other figures according to these figures without inventive work.

DETAILED DESCRIPTION OF EMBODIMENTS

Figure 1:
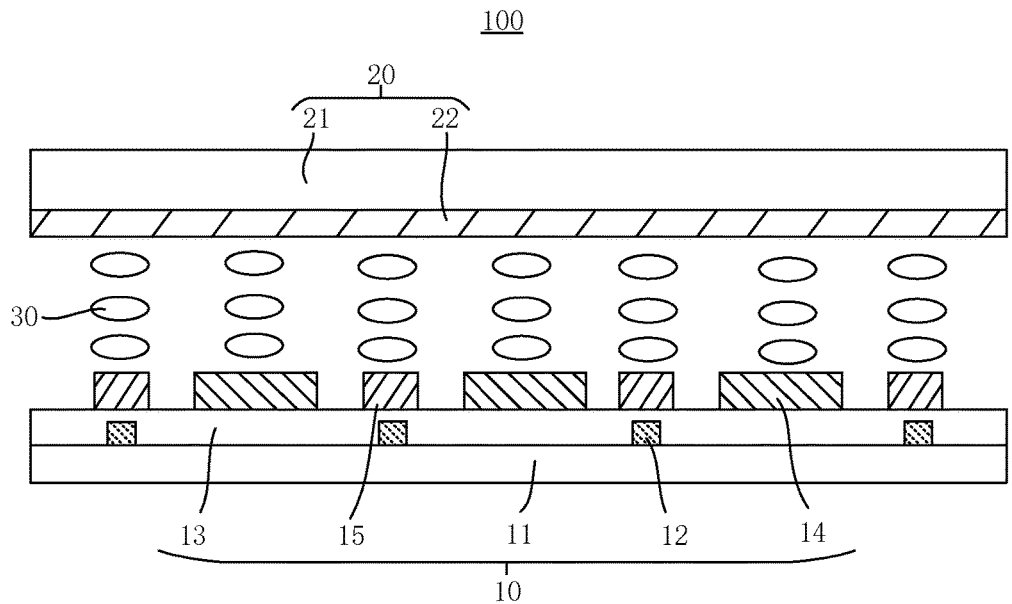
FIG. 1 is a schematic cross-sectional view of a liquid crystal display panel according to a preferable embodiment of the present invention.

Technical solutions of the present invention will be clearly and completely described below in conjunction with the accompanying drawings and with reference to the embodiments of the present invention. Obviously, the described embodiments are only some of the embodiments of the present invention, rather than all the embodiments. Based on the embodiments of the present invention, all other embodiments obtained by those skilled in the art without creative work shall fall within the protection scope of the present invention.

In the description of the present invention, it should be understood that the directional terms such as "upper", "lower", etc. are based on the orientation or positional relationship shown in the drawings, and are only for the convenience of describing the present invention and simplifying the description. The directional terms do not indicate or imply that the device or element referred to must have a specific orientation, or be configured and operated in a specific orientation, and therefore cannot be understood as a limitation to the present invention. In addition, the terms "first" and "second" are only used for illustrative purposes, and cannot be understood as indicating or implying relative importance or implicitly indicating the number of indicated technical features. Therefore, the features defined with "first" and "second" may explicitly or implicitly include one or more of the features. In the description of the present invention, "multiple" means two or more, unless otherwise specifically defined.

Reference numbers and/or reference letters can be repeated in different embodiments of the present application. Such repetition is for the purpose of simplification and clarity, and does not indicate a relationship between various embodiments and/or between various configurations discussed.

The present invention solves a problem that during an alignment process of liquid crystals of a conventional liquid crystal display (LCD) panel, rotation angles of the liquid crystals near a data black-matrix less (DBS) electrodes area among the liquid crystals corresponding to pixel electrodes are affected by the liquid crystals corresponding to the DBS electrodes, resulting in low light transmittance of the LCD panel. By inputting voltages of the pixel electrodes into the DBS electrodes at a gray scale 255 (i.e., a 255th gray scale), rotation of the liquid crystals at the DBS electrodes is consistent with rotation of the liquid crystals at the pixel electrodes, thereby improving brightness at the DBS electrodes of the LCD panel at the gray scale 255, thus further improving the light transmittance of the LCD panel.

The gray scale mentioned in the present invention refers to brightness levels. For digital display technology, the gray scale is a key factor deciding a number of displayed colors. Generally speaking, the greater a number of the gray scales, the richer the displayed colors, the more delicate an image, and the easier it is to express rich details. A range between white and black is divided into multiple levels by using a logarithmic relationship, which is called "gray scale levels", generally ranging from 0 to 255. White is at the gray scale 255 (i.e., the 255th gray scale), and black is at the gray scale 0, so black and white pictures are also called gray-scale images, and another concept similar to the gray scale is gray levels which are used to define an image by a two-dimensional function $f(x, y)$, where x and y are spatial plane coordinates. On any pair of coordinate axes, the x, y values of the f function refer to intensity or the gray level of the image at that point. That is to say, the gray level refers to tone levels on black and white images, which express intensity of electromagnetic wave radiation of an object. The gray levels are scales for dividing spectral characteristics of the object.

Pixels are called image elements in Chinese. Pixels are only a unit for resolution, but not for indicating image quality. Like photos, digital images are also composed of continuous shades and tones. If the images are enlarged multiple times, it can be found that these continuous tones are actually composed of many small square dots with similar colors. These small square dots are smallest units, i.e., pixels, that constitute the image. This smallest graphic unit is usually displayed as a single dye point on a screen. The more the pixels, the more colors a palette has, and the better true colors can be expressed. By definition, pixels refer to basic codes of basic original colors and their gray scales.

An alignment method of a liquid crystal display panel of the present invention is described in detail below in conjunction with specific embodiments.

Figure 2:
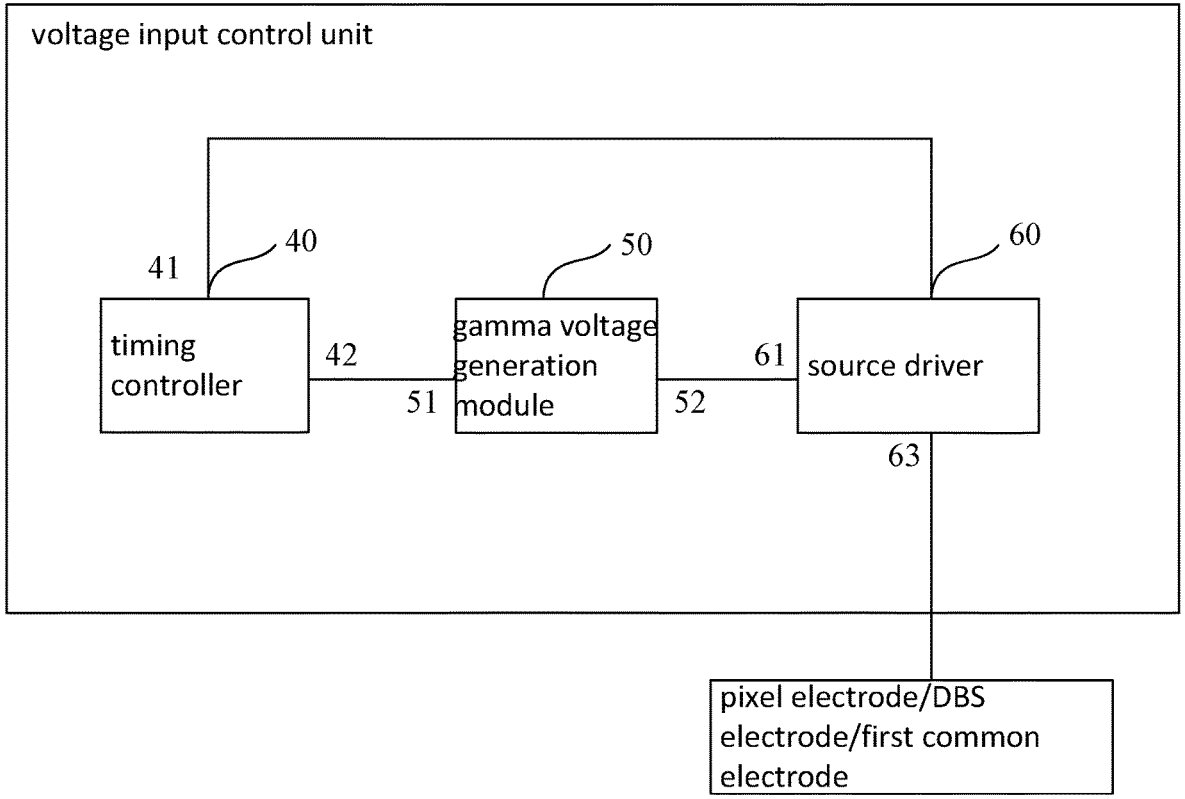
FIG. 2 is a schematic diagram illustrating a voltage input control unit according to a preferable embodiment of the present invention.

Please refer to FIGS. 1-2, a liquid crystal display panel 100 is provided according to a preferable embodiment of the present invention.

The liquid crystal display panel 100 comprises an array substrate 10, a color filter substrate 20, and liquid crystals 30 formed between the array substrate 10 and the color filter substrate 20.

The array substrate 10 comprises a first substrate 11, a plurality of data lines 12 formed on the first substrate 11, an insulating layer 13 formed on the first substrate 11 and covering the data lines 12, and a plurality of pixel electrodes 14 and a plurality of data black-matrix less (DBS) electrodes 15 formed on the insulating layer 13. One pixel electrode 14 is adjacent to one DBS electrode 15. A projection of each of the DBS electrodes 15 covers the corresponding data line 12.

The pixel electrodes 14 and the DBS electrodes 15 are arranged on a same layer of the array substrate 10.

The array substrate 10 further comprises a plurality of thin film transistors (not illustrated), and the data lines 12 are electrically connected to the pixel electrodes 14 through the thin film transistors.

The array substrate 10 further comprises a plurality of scan lines (not illustrated), and each of the thin film transistors is electrically connected to one of the scan lines.

The color filter substrate 20 comprises a second substrate 21 and a plurality of first common electrodes 22 formed on the second substrate 21, and the first common electrodes 22 are arranged on one side of the second substrate 21 and facing the liquid crystals 30.

Specifically, referring to FIG. 2, the liquid crystal display panel 100 further comprises a voltage input control unit, and the voltage input control unit is configured to supply each of the pixel electrodes 14, each of the DBS electrodes 15, and each of the first common electrodes 22 with a pixel voltage, a DBS voltage, and a first common voltage. Both the pixel voltage and the DBS voltage comprise a positive frame voltage and a negative frame voltage.

In an optional embodiment of the present invention, an absolute value of a difference between the positive frame voltage and the first common voltage is equal to an absolute value of a difference between the negative frame voltage and the first common voltage, so as to prevent flickering.

The voltage input control unit comprises a timing controller 40, a gamma voltage generation module 50, and a source driver 60.

An input end 51 of the gamma voltage generation module 50 is electrically connected to a first control end 41 of the timing controller 40, a second control end 42 of the timing controller 40 is electrically connected to a second input end 62 of the source driver 60, a first input end 61 of the source driver 60 is electrically connected to an output end 52 of the gamma voltage generation module 50, and an output end 63 of the source driver 60 is connected to the pixel electrodes 14, the DBS electrodes 15, and the first common electrodes 22.

The gamma voltage generation module 50 is configured to generate gamma voltages. The gamma voltages are used to control the gray scale of the liquid crystal display panel.

In the present embodiment, the gamma voltages are categorized into fourteen groups of voltages (GM1 to GM14), where GM1 to GM7 are positive frame voltages, and GM8 to GM14 are negative frame voltages. In the present embodiment, GM1 and GM14 correspond to the positive frame voltage and negative frame voltage at the gray scale 255 (the 255th gray scale), and GM7 and GM8 correspond to the positive frame voltage and the negative frame voltage at the gray scale 0.

In other embodiments, the gamma voltages can also be categorized according to actual conditions.

The timing controller 40 is used to control the gamma voltage generation module 50 to output the gamma voltages to the source driver 60.

The source driver 60 is configured to divide and output the gamma voltages to obtain the pixel voltage, or the DBS voltage, or the first common voltage which matches a number of the pixel electrodes 14, or a number of the DBS electrodes 15, or a number of the first common electrodes 22.

Figure 3:
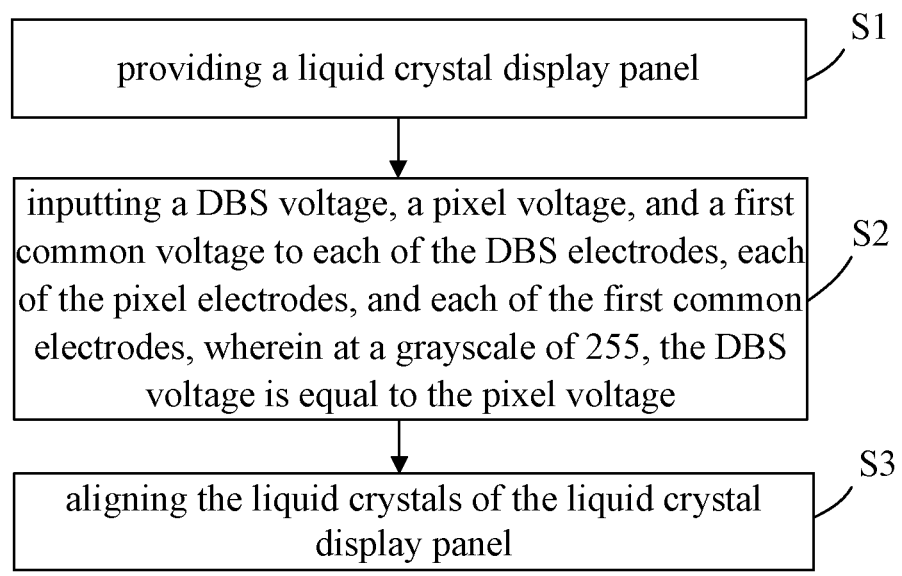
FIG. 3 is a process flow diagram illustrating an alignment method of the liquid crystal display panel according to a preferable embodiment of the present invention.

Please refer to FIG. 3. An alignment method of a liquid crystal display panel is provided according to a preferable embodiment of the present invention. The alignment method of the liquid crystal display panel comprises following steps:

step S1: providing a liquid crystal display panel, wherein the liquid crystal display panel is the liquid crystal display panel 100 mentioned above;

step S2: inputting a DBS voltage, a pixel voltage, and a first common voltage to each of the DBS electrodes 15, each of the pixel electrodes 14, and each of the first common electrodes 22, wherein at a gray scale 255 (i.e., a 255th gray scale), the DBS voltage is equal to the pixel voltage, and the DBS voltage is equal to the first common voltage at the gray scale ranging from 0 to 254.

At the gray scale 255, electric fields are generated between the DBS electrodes 15 and the first common electrodes 22, and between the pixel electrodes 14 and the first common electrodes 22, so that the liquid crystals 30 corresponding to the DBS electrodes 15 are rotated synchronously with the liquid crystals 30 corresponding to the pixel electrodes 14, and thereby brightness at the DBS electrodes of the liquid crystal display panel at the gray scale 255 can be improved, thus increasing light transmittance of the liquid crystal display panel 100.

At the gray scale ranging from 0 to 254, no electric field is generated between the DBS electrodes 15 and the first common electrodes 22, and electric fields are generated between the pixel electrodes 14 and the first common electrodes 22, so the liquid crystals 30 corresponding to the DBS electrodes 15 are not rotated, and the liquid crystals 30 corresponding to the pixel electrodes 14 are rotated.

step S3: aligning the liquid crystals of the liquid crystal display panel.

In the present embodiment, an alignment process is performed on the liquid crystal display panel 100 through a high vertical alignment (HVA alignment) technology.

In the liquid crystal display panel and the alignment method of the liquid crystal display panel of the present invention, a voltage equal to the pixel voltage is input into the DBS electrodes at the gray scale 255, which can make the rotation of the liquid crystals at the DBS electrodes consistent with the rotation of the liquid crystals at the pixel electrodes during the alignment process. As a result, the present invention improves the brightness at the DBS electrodes of the liquid crystal display panel at the gray scale 255, thereby increasing the light transmittance of the liquid crystal display panel.

In summary, although the present invention is disclosed as above in preferable embodiments, the above-mentioned preferable embodiments are not intended to limit the present invention. Those of ordinary skill in the art can make various modifications and changes without departing from the spirit and scope of the present invention. Therefore, the protection scope of the present invention is defined by the appended the claims.

What is claimed is:

1. An alignment method of a liquid crystal display panel, comprising:

step S1: providing a liquid crystal display panel, wherein the liquid crystal display panel comprises an array substrate, a color filter substrate, and liquid crystals formed between the array substrate and the color filter substrate; the array substrate comprises a plurality of data black-matrix less (DBS) electrodes and a plurality of pixel electrodes; and a plurality of first common electrodes are disposed on one side of the color filter substrate and arranged facing the liquid crystals;

step S2: inputting a DBS voltage to each of the DBS electrodes, a pixel voltage to each of the pixel electrodes, and a first common voltage to each of the first common electrodes, wherein at a gray scale 255, the DBS voltage is equal to the pixel voltage; and step S3: aligning the liquid crystals of the liquid crystal display panel.

2. The alignment method of the liquid crystal display panel according to claim 1, wherein the DBS voltage is equal to the first common voltage at the gray scale ranging from 0 to 254.

3. The alignment method of the liquid crystal display panel according to claim 1, wherein the array substrate further comprises a plurality of data lines, and projections of the DBS electrodes cover the data lines.

4. The alignment method of the liquid crystal display panel according to claim 3, wherein the data lines are electrically connected to the pixel electrodes through a plurality of thin film transistors.

5. The alignment method of the liquid crystal display panel according to claim 4, wherein the liquid crystal display panel further comprises a voltage input control unit, and the voltage input control unit is configured to input the pixel voltage, the DBS voltage, and the first common voltage to each of the pixel electrodes, each of the DBS electrodes, and each of the first common electrodes.

6. The alignment method of the liquid crystal display panel according to claim 5, wherein the pixel voltage and the DBS voltage both comprise a positive frame voltage and a negative frame voltage.

7. The alignment method of the liquid crystal display panel according to claim 5, wherein the voltage input control unit comprises a timing controller, a gamma voltage generation module, and a source driver;

an input end of the gamma voltage generation module is electrically connected to a first control end of the timing controller, a second control end of the timing controller is electrically connected to a second input end of the source driver, a first input end of the source driver is electrically connected to an output end of the gamma voltage generation module, and an output end of the source driver is electrically connected to the pixel electrodes, the DBS electrodes, and the first common electrodes;

the gamma voltage generation module is configured to generate a gamma voltage;

the timing controller is configured to control the gamma voltage generation module to output the gamma voltage to the source driver; and the source driver is configured to divide the gamma voltage and output divided gamma voltages to obtain the pixel voltage or the DBS voltage or the first common voltage that matches a number of the pixel electrodes or a number of the DBS electrodes or a number of the first common electrodes.

8. A liquid crystal display panel, comprising:

an array substrate comprising a plurality of data black-matrix less (DBS) electrodes and a plurality of pixel electrodes;

a color filter substrate, wherein a plurality of first common electrodes are disposed on one side of the color filter substrate; and liquid crystals formed between the array substrate and the color filter substrate;

wherein at a gray scale 255, voltages of the DBS electrodes are equal to voltages of the pixel electrodes.

9. The liquid crystal display panel according to claim 8, wherein the voltages of the DBS electrodes are equal to voltages of the first common electrodes at the gray scale ranging from 0 to 254.

10. The liquid crystal display panel according to claim 8, wherein the voltages of the pixel electrodes and the voltages of the DBS electrodes all comprise a positive frame voltage and a negative frame voltage.

* * * * *